United States Patent
Kaneko et al.

(10) Patent No.: US 10,508,588 B2
(45) Date of Patent: Dec. 17, 2019

(54) COOLING DEVICE FOR INTERNAL COMBUSTION ENGINE

(71) Applicant: TOYOTA JIDOSHA KABUSHIKI KAISHA, Toyota-shi (JP)

(72) Inventors: Rihito Kaneko, Miyoshi (JP); Noboru Takagi, Toyota (JP); Naoto Hisaminato, Toyota (JP); Mitsuru Yamaguchi, Nagoya (JP); Hirokazu Andoh, Seto (JP); Masaaki Yamaguchi, Okazaki (JP); Yoshihiro Furuya, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/960,736

(22) Filed: Apr. 24, 2018

(65) Prior Publication Data
US 2018/0347445 A1 Dec. 6, 2018

(30) Foreign Application Priority Data
Jun. 5, 2017 (JP) .................. 2017-110615

(51) Int. Cl.
*F01P 7/14* (2006.01)
*F01P 7/16* (2006.01)
(Continued)

(52) U.S. Cl.
CPC ................. *F01P 7/165* (2013.01); *F01P 3/18* (2013.01); *F01P 3/20* (2013.01); *F01P 5/10* (2013.01);
(Continued)

(58) Field of Classification Search
CPC ............ B60H 1/00007; B60H 1/00021; B60H 1/00314; B60H 1/00321; B60H 1/00328;
(Continued)

(56) References Cited

U.S. PATENT DOCUMENTS 5,433,266 A * 7/1995 Doi ..................... B60H 1/00821
165/202
5,896,833 A * 4/1999 Aoki ................... B60H 1/00878
123/41.14
(Continued)

FOREIGN PATENT DOCUMENTS

JP 2012-132422 7/2012
JP 2017-57769 3/2017
WO WO 2017/022378 A1 2/2017

*Primary Examiner* — Erick R Solis
*Assistant Examiner* — Robert A Werner
(74) *Attorney, Agent, or Firm* — Oblon, McClelland, Maier & Neustadt, L.L.P.

(57) ABSTRACT

A cooling device includes: an air blast passage; a heater core that is disposed in the air blast passage; an air blast volume adjusting member that is opened and closed to adjust an air blast volume which flows in the heater core; a flow rate adjuster that adjusts a flow rate of the coolant which is introduced into the heater core; and a controller. The controller sets the flow rate of the coolant which is adjusted by the flow rate adjuster to be less than a lower limit value of an adjustable range of the flow rate of the coolant which is adjusted by the flow rate adjuster in a vehicle compartment air-conditioning state in which the air blast volume adjusting member allows an air blast to flow to the heater core when the air blast volume adjusting member fully closes the heater core side of the air blast passage.

5 Claims, 5 Drawing Sheets

(51) Int. Cl.
  *F01P 3/20*  (2006.01)
  *F01P 3/18*  (2006.01)
  *F01P 11/16*  (2006.01)
  *F01P 5/10*  (2006.01)

(52) U.S. Cl.
  CPC .............. *F01P 7/14* (2013.01); *F01P 11/16* (2013.01); *F01P 2007/146* (2013.01); *F01P 2037/00* (2013.01)

(58) Field of Classification Search
  CPC ............ B60H 1/00835; B60H 1/00885; B60H 2001/00092; B60H 2001/00164; B60H 2001/0035; F01P 7/165; F01P 2007/146; F01P 7/16
  USPC ......... 123/41.01, 41.02, 41.04, 41.05, 41.08, 123/41.19; 165/41–43, 202, 247, 266
  See application file for complete search history.

(56) References Cited

U.S. PATENT DOCUMENTS

| | | | |
|---|---|---|---|
| 6,422,308 B1 * | 7/2002 | Okawara | B60H 1/00921 165/202 |
| 2003/0200948 A1 * | 10/2003 | Ban | B60H 1/00492 123/142.5 R |
| 2006/0231640 A1 * | 10/2006 | Hashimura | B60H 1/00492 237/3 |
| 2015/0275741 A1 | 10/2015 | Amano | |
| 2017/0074153 A1 | 3/2017 | Kaneko et al. | |
| 2018/0195780 A1 | 7/2018 | Itou et al. | |

* cited by examiner

COOLING DEVICE FOR INTERNAL COMBUSTION ENGINE

INCORPORATION BY REFERENCE

The disclosure of Japanese Patent Application No. 2017-110615 filed on Jun. 5, 2017 including the specification, drawings and abstract is incorporated herein by reference in its entirety.

BACKGROUND

1. Technical Field

The disclosure relates to a cooling device for an internal combustion engine. Particularly, the disclosure relates to an improvement in control of adjusting a flow rate of a coolant in a coolant circulation circuit in response to a vehicle compartment air-conditioning request.

2. Description of Related Art

Control of stopping circulation of a coolant (so-called coolant stop control) in a coolant circulation circuit during a warming-up operation such that the warming-up operation at the time of cold start of an internal combustion engine (an engine) can be completed earlier to enhance a fuel consumption ratio is known.

Japanese Unexamined Patent Application Publication No. 2012-132422 (JP 2012-132422 A) discloses control of closing a coolant valve to stop circulation of a coolant in a part of a coolant circulation circuit during a warming-up operation and opening the coolant valve to supply the coolant (warm coolant) to an air-conditioning heater core when a vehicle compartment air-conditioning request is issued during the warming-up operation.

SUMMARY

However, in JP 2012-132422 A, the coolant valve is opened to supply the coolant to the heater core during the warming-up operation regardless of the type of the air-conditioning request (whether the air-conditioning request is a heating request or a cooling request). That is, JP 2012-132422 A does not disclose a technical concept in which a circulation type of the coolant is defined depending on the type of an air-conditioning request during the warming-up operation. Accordingly, in JP 2012-132422 A, when a cooling request is issued during the warming-up operation, a coolant is supplied to the heater core, heat of the coolant is taken away by the heater core and a pipe for supplying the coolant to the heater core, and thus an increase in temperature of the coolant is slow. As a result, there is room for improvement in completing a warming-up operation earlier to achieve an improvement in a fuel consumption ratio.

The disclosure provides a cooling device for an internal combustion engine that can earlier increase a temperature of a coolant when a cooling request is issued.

According to an aspect of the disclosure, there is provided a cooling device for an internal combustion engine, including: an air blast passage in which an air blast for air-conditioning a vehicle compartment flows; a heater core that is disposed in the air blast passage and heats the air blast using a coolant which is introduced from the internal combustion engine as a heat source; an air blast volume adjusting member that is opened and closed to adjust an air blast volume which flows in the heater core and an air blast volume which flows without passing through the heater core in the air blast passage; a flow rate adjuster that adjusts a flow rate of the coolant which is introduced into the heater core; and a controller configured to set the flow rate of the coolant which is adjusted by the flow rate adjuster. The controller sets the flow rate of the coolant which is adjusted by the flow rate adjuster to be less than a lower limit value of an adjustable range of the flow rate of the coolant which is adjusted by the flow rate adjuster in a vehicle compartment air-conditioning state in which the air blast volume adjusting member allows an air blast to flow to the heater core when the air blast volume adjusting member fully closes the heater core side of the air blast passage.

According to this specific configuration, when the heater core side of the air blast passage is fully closed by the air blast volume adjusting member, the flow rate of the coolant which is adjusted by the flow rate adjuster (the flow rate of the coolant which is introduced into the heater core) is set to be less than the lower limit value of the adjustable range of the flow rate of the coolant which is adjusted in the vehicle compartment air-conditioning state in which an air blast flows in the heater core. That is, when the heater core side of the air blast passage is fully closed, an amount of heat of the coolant which is taken away by the heater core and a pipe for supplying the coolant to the heater core can be set to a low value or zero by setting the flow rate of the coolant which is introduced into the heater core to a low value or zero. Accordingly, when a vehicle compartment cooling request is issued in a situation in which the temperature of the coolant is relatively low, it is possible to prevent an increase in temperature of the coolant from becoming slow. Accordingly, when a warming-up operation of an internal combustion engine is performed (when a cooling request during a warming-up operation is issued), it is possible to complete the warming-up operation earlier and to achieve an improvement in fuel consumption ratio.

In the aspect, the controller may set the flow rate of the coolant which is adjusted by the flow rate adjuster to be equal to or greater than the lower limit value of the adjustable range of the flow rate of the coolant which is adjusted in the vehicle compartment air-conditioning state when the air blast volume adjusting member does not fully close the heater core side of the air blast passage during a warming-up operation of the internal combustion engine, and may set the flow rate of the coolant which is adjusted by the flow rate adjuster to be less than the lower limit value of the adjustable range when the air blast volume adjusting member fully closes the heater core side of the air blast passage during the warming-up operation of the internal combustion engine.

According to this configuration, when an air-conditioning request such as a vehicle compartment heating request is issued during the warming-up operation for the internal combustion engine (when the heater core side of the air blast passage is not fully closed), the flow rate of the coolant which is adjusted by the flow rate adjuster (the flow rate of the coolant which is introduced into the heater core) can be set to a predetermined adjustable range (to be equal to or greater than the lower limit value of the adjustable range) and it is possible to cope with the air-conditioning request (for example, a heating request). On the other hand, when the air blast volume adjusting member fully closes the heater core side of the air blast passage (when a high cooling request is issued) during the warming-up operation for the internal combustion engine, it is possible to complete the warming-up operation earlier and to achieve an improvement in fuel consumption ratio by setting the flow rate of the coolant which is adjusted by the flow rate adjuster (the flow rate of the coolant which is introduced into the heater core) to be less than the lower limit value of the adjustable range and setting the amount of heat of the coolant which is taken away by the heater core and a pipe for supplying the coolant to the heater core to a low value or zero.

In the aspect, the controller may set the flow rate of the coolant which is adjusted by the flow rate adjuster to zero when the air blast volume adjusting member fully closes the heater core side of the air blast passage.

According to this configuration, the amount of heat of the coolant which is taken away by the heater core and the pipe for supplying the coolant to the heater core can be set to a low value or zero. Accordingly, when a vehicle compartment cooling request is issued in a situation in which the temperature of the coolant is relatively low, it is possible to rapidly increase the temperature of the coolant.

According to the aspect, when the heater core side of the air blast passage is fully closed, the flow rate of the coolant which is introduced into the heater core is set to be less than the lower limit value of the adjustable range of the flow rate of the coolant which is adjusted in the vehicle compartment air-conditioning state in which an air blast flows in the heater core. Accordingly, when the heater core side of the air blast passage is fully closed, the amount of heat of the coolant which is taken away by the heater core and the pipe for supplying the coolant to the heater core can be set to a low value or zero. As a result, it is possible to rapidly increase the temperature of the coolant when a vehicle compartment cooling request is issued.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
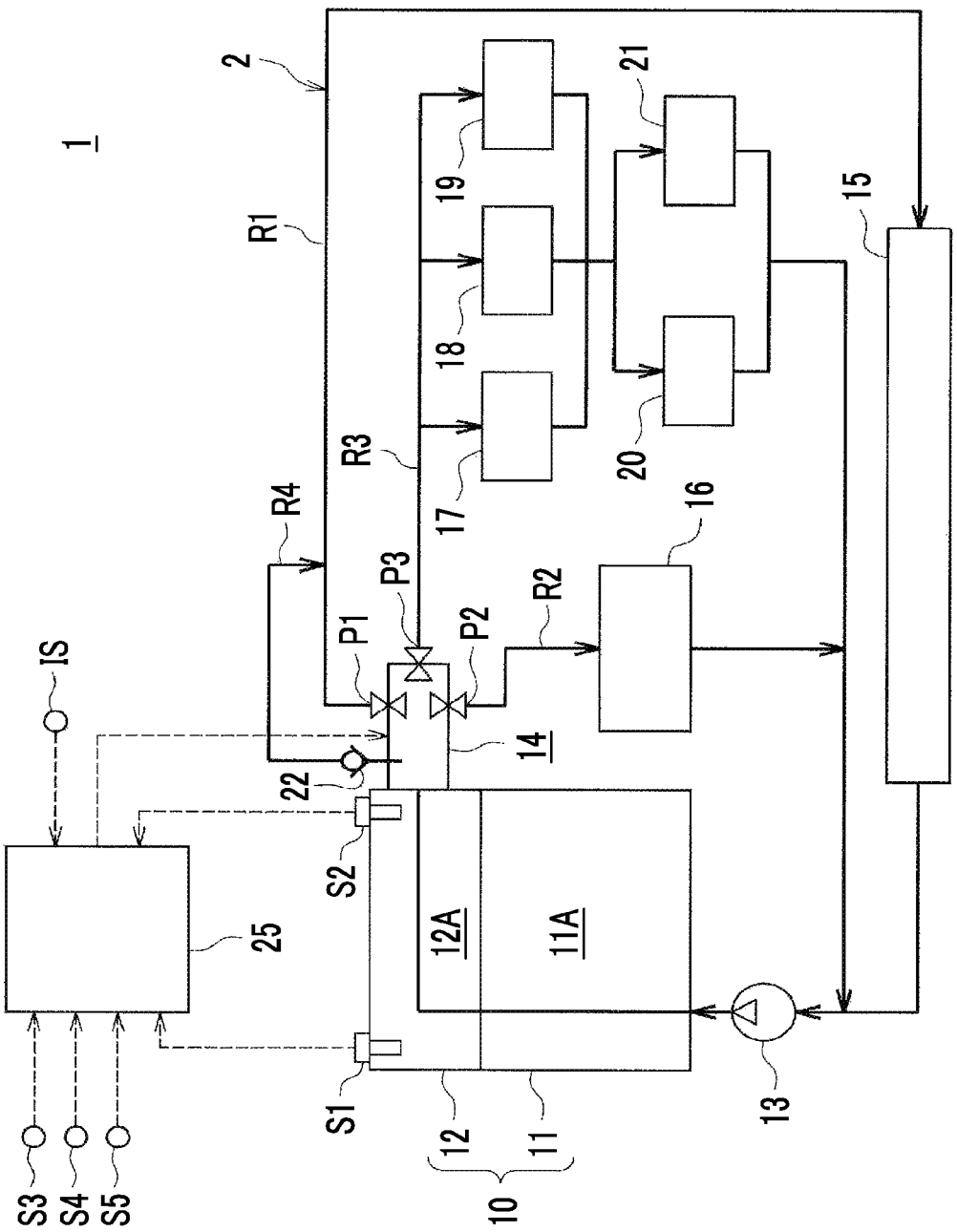
FIG. 1 is a diagram schematically illustrating an entire configuration of an engine cooling device according to an embodiment.

Hereinafter, embodiments of the disclosure will be described with reference to the accompanying drawings. In the embodiments, it is assumed that the disclosure is applied to an engine which is mounted in a vehicle.
Configuration of Engine Cooling Device A configuration of an engine cooling device (a cooling device for an internal combustion engine) 1 according to an embodiment will be first described below with reference to FIG. 1. In FIG. 1, a flow of a coolant in a coolant circulation circuit 2 which is disposed in the engine cooling device 1 is denoted by a solid arrow.

As illustrated in FIG. 1, water jackets 11A and 12A constituting a part of the coolant circulation circuit 2 are provided in a cylinder block 11 and a cylinder head 12 of an engine 10. A water pump 13 that causes a coolant to circulate in the coolant circulation circuit 2 is provided in a part upstream from the water jackets 11A and 12A in the coolant circulation circuit 2. The water pump 13 is a so-called mechanical water pump 13 that operates with power from a crank shaft (not illustrated) of the engine 10. A coolant discharged from the water pump 13 is introduced into the water jackets 11A and 12A.

An inlet coolant temperature sensor S1 that detects the temperature of a coolant (an inlet coolant temperature Tin) immediately after the coolant flows from the water jacket 11A of the cylinder block 11 (of an upstream end portion of the water jacket 12A) is provided in the water jacket 12A of the cylinder head 12. An outlet coolant temperature sensor S2 that detects the temperature of the coolant (an outlet coolant temperature Tout) immediately before the coolant flows out of the water jacket 12A (of a downstream end portion of the water jacket 12A) is provided in the water jacket 12A of the cylinder head 12.

A rotary valve (the flow rate adjuster described in the claims) 14 is attached to a portion in which a coolant outlet of the water jacket 12A is provided in the cylinder head 12, and the coolant passing through the water jackets 11A and 12A flows into the rotary valve 14. The coolant circulation circuit 2 branches into three coolant passages including a radiator coolant passage R1, a heater core coolant passage R2, and a device coolant passage R3 in the rotary valve 14. Among these, the radiator coolant passage R1 is a coolant passage that supplies a coolant to a radiator 15 that cools the coolant by heat exchange with outside air. The heater core coolant passage R2 is a coolant passage that supplies a coolant to the heater core 16 which is a heat exchanger that heats an air blast to a vehicle compartment with heat of the coolant when heating is performed by an air conditioner 50 (see FIG. 3) of an air conditioning unit 30 which will be described later. The device coolant passage R3 is a coolant passage that supplies a coolant to devices 17 to 21 to which heat of the engine 10 is transmitted using the coolant as a carrier medium. A passage sectional area of the radiator coolant passage R1 is set to be larger than the passage sectional areas of the heater core coolant passage R2 and the device coolant passage R3 such that a larger amount of coolant can flow than in the heater core coolant passage R2 and the device coolant passage R3.

The radiator coolant passage R1 supplies a coolant to the radiator 15 and then returns the coolant to the water pump 13 in a portion downstream from the radiator 15.

The device coolant passage R3 branches into three passages to supply a coolant to a throttle body 17, an exhaust gas recirculation (EGR) valve 18, and an EGR cooler 19 at the branch destinations. The device coolant passage R3 merges temporarily downstream from the throttle body 17, the EGR valve 18, and the EGR cooler 19, branches into two passages, and supplies a coolant to an oil cooler 20 and an automatic transmission fluid (ATF) warmer 21 at the branch destinations. The device coolant passage R3 merges again downstream from the oil cooler 20 and the ATF warmer 21, merges at a downstream portion of the radiator 15 in the radiator coolant passage R1 downstream of the merging position, joins with the radiator coolant passage R1 downstream from the merging position, and then is connected to the water pump 13.

The heater core coolant passage R2 supplies a coolant to the heater core 16 and then merges with the downstream portion of the oil cooler 20 and the ATF warmer 21 in the device coolant passage R3 downstream from the heater core 16. The heater core coolant passage R2 joins with the device coolant passage R3 downstream from the merging position, joins with the radiator coolant passage R1 downstream from the merging position of the device coolant passage R3 and the radiator coolant passage R1, and then is connected to the water pump 13.

A relief valve 22 that is opened to release the pressure of the coolant therein when the pressure thereof increases excessively is provided in the rotary valve 14. A relief coolant passage R4 is connected to the relief valve 22, and a downstream portion of the relief coolant passage R4 merges with an upstream portion of the radiator 15 in the radiator coolant passage R1.

The engine cooling device 1 is controlled by an electronic control unit 25 which is a controller for the engine cooling device 1. The electronic control unit 25 includes a central processing unit that performs various arithmetic operations associated with the control of the engine cooling device 1, a read only memory that stores control programs or data in advance, and a readable and writable memory that temporarily stores operation results of the central processing unit, detection results of sensors, and the like.

Detection signals of sensors which are provided in various parts of a vehicle such as a crank angle sensor S3, an air flow meter S4, and an outside air temperature sensor S5, in addition to the inlet coolant temperature sensor S1 and the outlet coolant temperature sensor S2, are input to the electronic control unit 25. The crank angle sensor S3 detects a rotational phase (a crank angle) of a crank shaft which is an output shaft of the engine 10. The air flow meter S4 detects an amount of intake air Ga of the engine 10. The outside air temperature sensor S5 detects an outside air temperature Tho. The outside air temperature Tho substantially matches the vehicle compartment temperature when the vehicle compartment is not air-conditioned or before the cold start of the engine 10.

An IG signal which is a signal indicating an operation state of an ignition switch IS is input to the electronic control unit 25. The IG signal is switched to an ON state when the ignition switch IS is turned on and is maintained in the ON state until the ignition switch IS is turned off. The IG signal is switched to an OFF state when the ignition switch IS is turned off and is maintained in the OFF state until the ignition switch IS is turned on again.

The electronic control unit 25 calculates a rotation speed of the engine 10 (an engine rotation speed Ne) from the detection result of the crank angle from the crank angle sensor S3. The electronic control unit 25 calculates an amount of air suctioned into the cylinder of the engine 10 (a cylinder intake air amount KL) from the amount of intake air Ga and the engine rotation speed Ne.

Rotor Phase

The rotary valve 14 includes a radiator port P1 that communicates with the radiator coolant passage R1, a heater core port P2 that communicates with the heater core coolant passage R2, and a device port P3 that communicates with the device coolant passage R3. The rotary valve 14 changes opening ratios of the ports P1 to P3 depending on a rotational phase (hereinafter referred to as a rotor phase $\theta$) of a rotor (not illustrated) incorporated therein. Configurations for changing the opening ratios of the ports P1 to P3 depending on the rotor phase $\theta$ are known and thus will not be described (for example, see Japanese Unexamined Patent Application Publication No. 2017-57769 (JP 2017-57769 A)).

Figure 2:
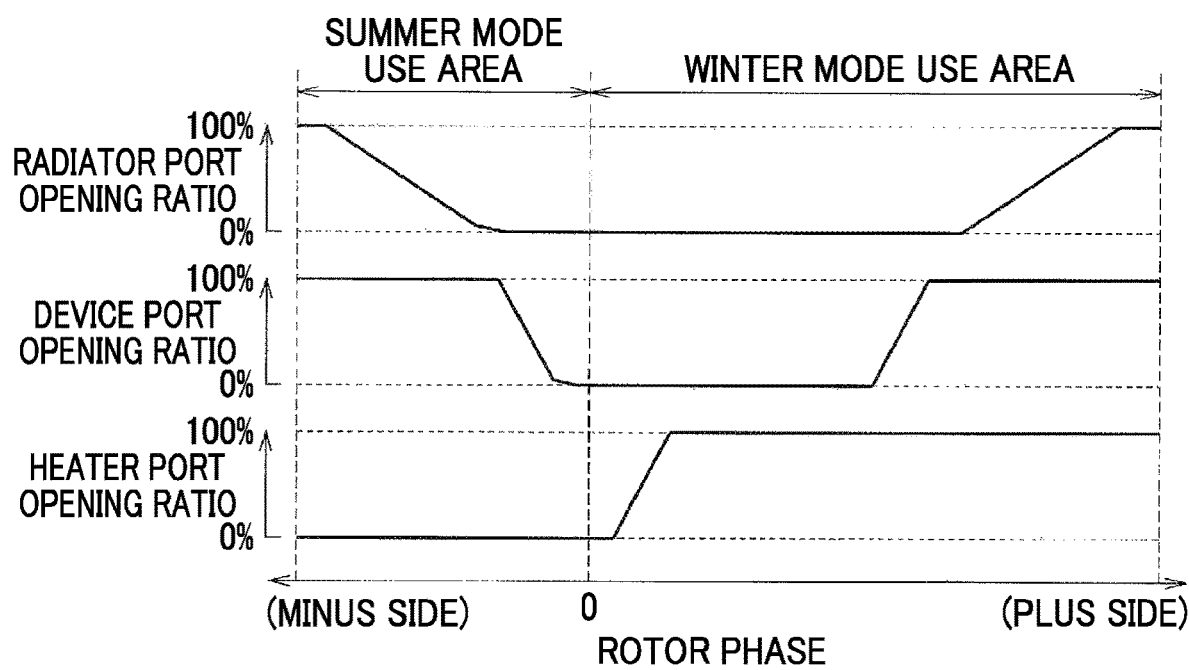
FIG. 2 is a diagram illustrating a relationship between a rotor phase of a rotary valve and an opening ratio of each port.

FIG. 2 illustrates a relationship between the rotor phase $\theta$ of the rotary valve 14 and the opening ratios of the ports P1 to P3. The rotor phase $\theta$ indicates a rotation angle of the rotor in one direction (a plus direction) and the opposite direction (a minus direction) from a position at which the rotor phase $\theta$ is "0°" where the position is defined as a position at which all the ports P1 to P3 are closed. The opening ratio indicates a ratio of an opening area of each of the ports P1 to P3 when the opening area when they are fully opened is set to "100%."

As illustrated in the drawing, the opening ratios of the ports P1 to P3 are set to vary depending on the rotor phase $\theta$. A range of the rotor phase $\theta$ on a plus side from the position at which the rotor phase $\theta$ is "0°" is defined as a range of the rotor phase $\theta$ (a winter mode use area) which is used when the outside air temperature is low and there is a high likelihood that heating of the vehicle compartment will be used (in a winter mode). A range of the rotor phase $\theta$ on a minus side from the position at which the rotor phase $\theta$ is "0°" is defined as a range of the rotor phase $\theta$ (a summer mode use area) which is used when the outside air temperature is high and there is a low likelihood that heating of the vehicle compartment will be used (in a summer mode).

When the rotor rotates in the plus direction from the position at which the rotor phase $\theta$ is "0°," first, the heater core port P2 starts opening and the opening ratio of the heater core port P2 increases gradually with an increase in the rotor phase $\theta$ in the plus direction. When the heater core port P2 is fully opened, that is, the opening ratio thereof is "100%," then, the device port P3 starts opening and the opening ratio of the device port P3 increases gradually with an increase in the rotor phase $\theta$ in the plus direction. Then, when the device port P3 is fully opened, that is, the opening ratio thereof is "100%," the radiator port P1 starts opening and the opening ratio of the radiator port P1 increases gradually with an increase in the rotor phase $\theta$ in the plus direction.

On the other hand, when the rotor rotates in the minus direction from the position at which the rotor phase $\theta$ is "0°," first, the device port P3 starts opening and the opening ratio of the device port P3 increases gradually with an increase in the rotor phase $\theta$ in the minus direction. When the device port P3 is fully opened, that is, the opening ratio thereof is "100%," then, the radiator port P1 starts opening and the opening ratio of the radiator port P1 increases gradually with an increase in the rotor phase $\theta$ in the minus direction. In addition, the heater core port P2 is normally fully closed in the summer mode use area on the minus side from the position at which the rotor phase $\theta$ is "0°."

Air Conditioning Unit

Figure 3:
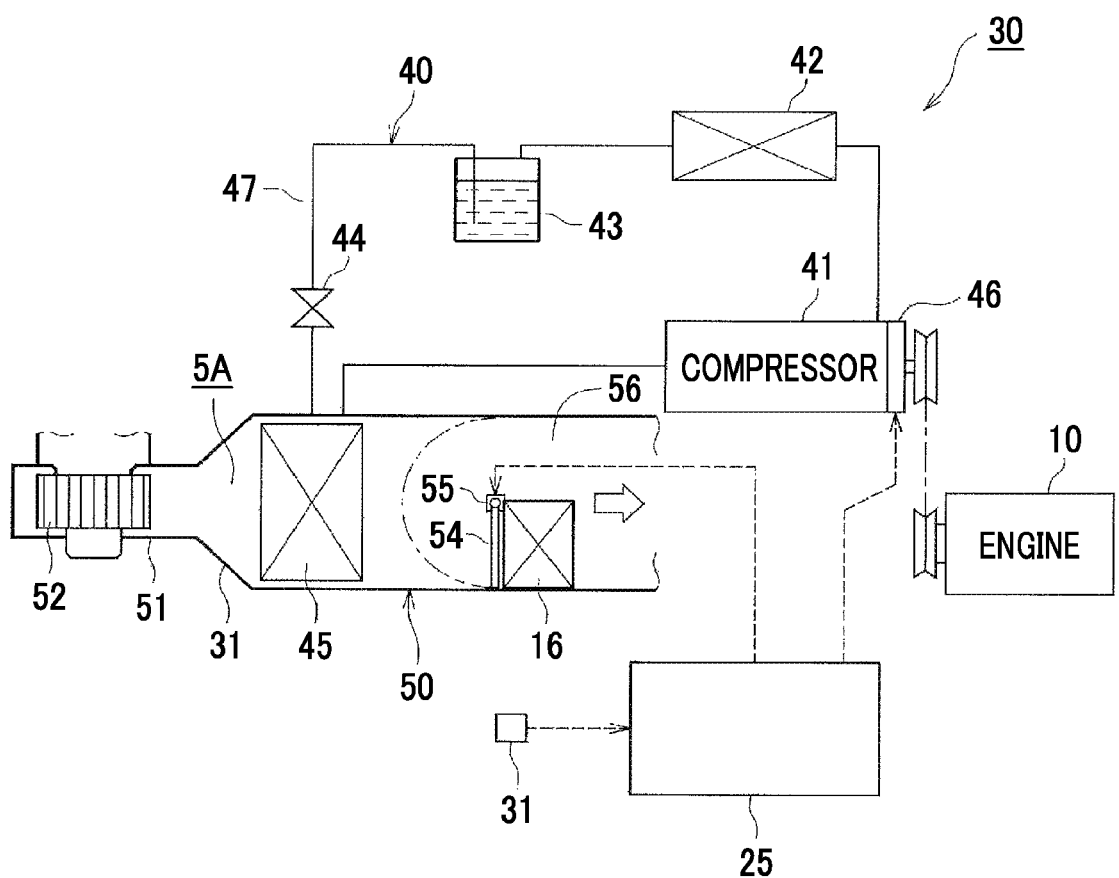
FIG. 3 is a diagram illustrating an entire configuration of an air conditioning unit.

FIG. 3 is a diagram schematically illustrating a configuration of the air conditioning unit 30 which is mounted in the vehicle according to the embodiment.

As illustrated in FIG. 3, the air conditioning unit 30 includes a refrigerant circulation circuit 40 and an air conditioner 50, and serves to cool air (an air blast) flowing in the air conditioner 50 using a refrigerant circulating in the refrigerant circulation circuit 40 and to supply the refrigerant to the vehicle compartment in a cooling operation.

The refrigerant circulation circuit 40 includes a compressor 41 that compresses a refrigerant, a condenser 42, a receiver (a gas-liquid separator) 43, an expansion plate (a pressure reducing mechanism) 44, and an evaporator 45. In the refrigerant circulation circuit 40, the compressor 41, the condenser 42, the receiver 43, the expansion plate 44, and the evaporator 45 are connected in an annular shape by a refrigerant pipe 47, and a refrigerant discharged from the compressor 41 flows in the order of condenser 42→receiver 43→expansion plate 44→evaporator 45 and flows into the compressor 41.

The compressor 41 is driven by the engine 10. The compressor 41 includes an electromagnetic clutch 46 for control of power transmission, and power of the engine 10 is transmitted to the compressor 41 via a V belt and the electromagnetic clutch 46. ON/OFF of the supply of power to the electromagnetic clutch 46 is switched by the electronic control unit 25, and the compressor 41 is started when the supply of power of the electromagnetic clutch 46 is turned on during operation of the engine 10 and the electromagnetic clutch 46 enters a connected state. On the other hand, when the supply of power to the electromagnetic clutch 46 is turned off and the electromagnetic clutch 46 enters a disconnected state, the compressor 41 is stopped. Turning on/off of the supply of power to the electromagnetic clutch 46 is performed, for example, by interlocking with an ON/OFF operation of an air conditioner switch 31 by an occupant. The air conditioner switch 31 is disposed, for example, on an air-conditioning operation panel which is provided in a front part of the vehicle compartment, and is connected to the electronic control unit 25. In addition to the air conditioner switch 31, a suction port switch that is used to switch a suction port mode, a temperature setting switch that is used to set the temperature of the vehicle compartment to a desired temperature (a target temperature), a wind volume switch that is used to set an amount of air blast from a blower 52 which will be described later to a manual mode, and a blow port switch that is used to switch a blow port mode are provided on the air-conditioning operation panel.

A gas refrigerant of a high temperature and a high pressure discharged from the compressor 41 is introduced into the condenser 42. The gas refrigerant introduced into the condenser 42 radiates heat by exchange of heat with outside air which is supplied by a cooling fan (not illustrated) and is condensed. The gas refrigerant of a high temperature and a high pressure which has been condensed by the condenser 42 is introduced into the receiver 43. The refrigerant introduced into the receiver 43 is separated into a liquid phase and a gas phase and the refrigerant of a liquid phase (a liquid refrigerant) is stored in the receiver 43. The liquid refrigerant of a high pressure from the receiver 43 is expanded by the expansion plate 44 and enters a two-phase state of gas and liquid.

The refrigerant of a low pressure decompressed by the expansion plate 44 is introduced into the evaporator 45. In the evaporator 45, the refrigerant of a low pressure absorbs heat from ambient air (an air blast flowing through the air blast passage 5A in an air-conditioning case 51 which will be described later) and is evaporated (vaporized) into a gas refrigerant. The evaporated gas refrigerant is suctioned and compressed by the compressor 41 again.

The evaporator 45 is disposed in an air-conditioning case 51 of the air conditioner 50. The air-conditioning case 51 includes an air blast passage 5A through which air is blown to an occupant in the vehicle compartment therein, and an inside/outside air switching box (not illustrated) including an inside air inlet and an outside air inlet is disposed most upstream in the air blast passage 5A.

An inside/outside air switching door (not illustrated) is rotatably disposed in the inside/outside air switching box of the air-conditioning case 51. The inside/outside air switching door is driven by, for example, a servo motor and thus can switch between an inside air mode in which inside air (air inside the vehicle compartment) is introduced from the inside air inlet and an outside air mode in which outside air (air from outside the vehicle compartment) is introduced from the outside air inlet. A blower 52 that generates an air flow directed to the vehicle compartment is disposed downstream from the inside/outside air switching box. The evaporator 45 is disposed downstream from the blower 52, and air flowing in the air blast passage 5A is cooled by the evaporator 45. That is, the evaporator 45 serves as a cooling heat exchanger that cools an air blast from the blower 52.

The heater core 16 that heats the air cooled by the evaporator 45 is disposed downstream from the evaporator 45. The heater core 16 is a heating heat exchanger that heats the air having passed through the evaporator 45 using the coolant of the engine 10 as a heat source as described above, and a bypass passage 56 in which air bypassing the heater core 16 flows is formed immediately therebeside.

An air mix door (the air blast volume adjusting member mentioned in the claims) 54 is rotatably disposed between the evaporator 45 and the heater core 16. The air mix door 54 is driven by a servo motor 55, and an amount of air (an amount of warm wind) passing through the heater core 16 and an amount of air (an amount of cold wind) bypassing the heater core 16 by passing through the bypass passage 56 can be adjusted by adjusting a degree of opening of the air mix door 54. Accordingly, a blowing temperature of air which is blown into the vehicle compartment is adjusted. A defroster blow port that blows air-conditioning wind to the window glass of the vehicle, a face blow port that blows air-conditioning wind to an upper half of an occupant, and a foot blow port (not illustrated) that blows air-conditioning wind to the feet of an occupant, and the like are provided most downstream of the air blast passage 5A of the air-conditioning case 51.

Control of Rotary Valve in Warming-Up Operation

Control of the rotary valve 14 in a warming-up operation of the engine 10 which characterizes the embodiment will be described below.

In JP 2012-132422 A which is the related art, the coolant valve is opened to supply a coolant to the heater core during the warming-up operation of the engine regardless of the type of an air-conditioning request (whether the air-conditioning request is a heating request or a cooling request). Accordingly, in JP 2012-132422 A, when a cooling request is issued during the warming-up operation, a coolant is supplied to the heater core, heat of the coolant is taken away by the heater core and the pipe for supplying the coolant to the heater core, and thus an increase in temperature of the coolant is slow. As a result, there is room for improvement in completing a warming-up operation earlier to achieve improvement in a fuel consumption ratio.

In the embodiment, in consideration of this problem, the warming-up operation is completed earlier when a cooling request is issued during the warming-up operation of the engine 10.

Specifically, when the air mix door 54 fully closes the heater core 16 side in the warming-up operation of the engine 10 (when an amount of air blast flowing in the heater core 16 is zero), the opening ratios of the ports P1 to P3 of the rotary valve 14 are set to "0%." Accordingly, by setting the flow rate of the coolant which is introduced into the heater core 16 to zero (by executing the coolant stop control), the amount of heat of the coolant which is taken away by the heater core 16 and the pipe of the heater core coolant passage R2 that supplies a coolant to the heater core 16 is set to zero. The amount of heat of the coolant which is taken away by the radiator 15 and the pipe of the radiator coolant passage R1 is set to zero. The amount of heat of the coolant which is taken away by the devices 17 to 21 and the device coolant passage R3 is set to zero. Accordingly, when a cooling request for the vehicle compartment is issued during the warming-up operation of the engine 10, it is possible to prevent the increase in temperature of the coolant from being slow. In this case, the opening ratio of the device port P3 of the rotary valve 14 may not be set to "0%" but the device port P3 may be opened at a predetermined opening ratio.

The above-mentioned operation is performed by the electronic control unit 25. Accordingly, the functional part that performs the operation of setting the opening ratio of the heater core port P2 of the rotary valve 14 or the like to "0%" when the air mix door 54 fully closes the heater core 16 side during the warming-up operation of the engine 10 is configured as the flow rate control unit (the flow rate control unit that sets the flow rate of the coolant which is adjusted by the flow rate adjuster to be less than the lower limit value of the adjustable range of the flow rate of the coolant which is adjusted in the vehicle compartment air-conditioning state in which the air blast volume adjusting member causes an air blast to flow into the heater core (more specifically, that sets the flow rate of the coolant to zero) when the air blast volume adjusting member fully closes the heater core side in the air blast passage) which is described in the claims.

A plurality of embodiments of the coolant stop control will be described below.

First Embodiment

Figure 4:
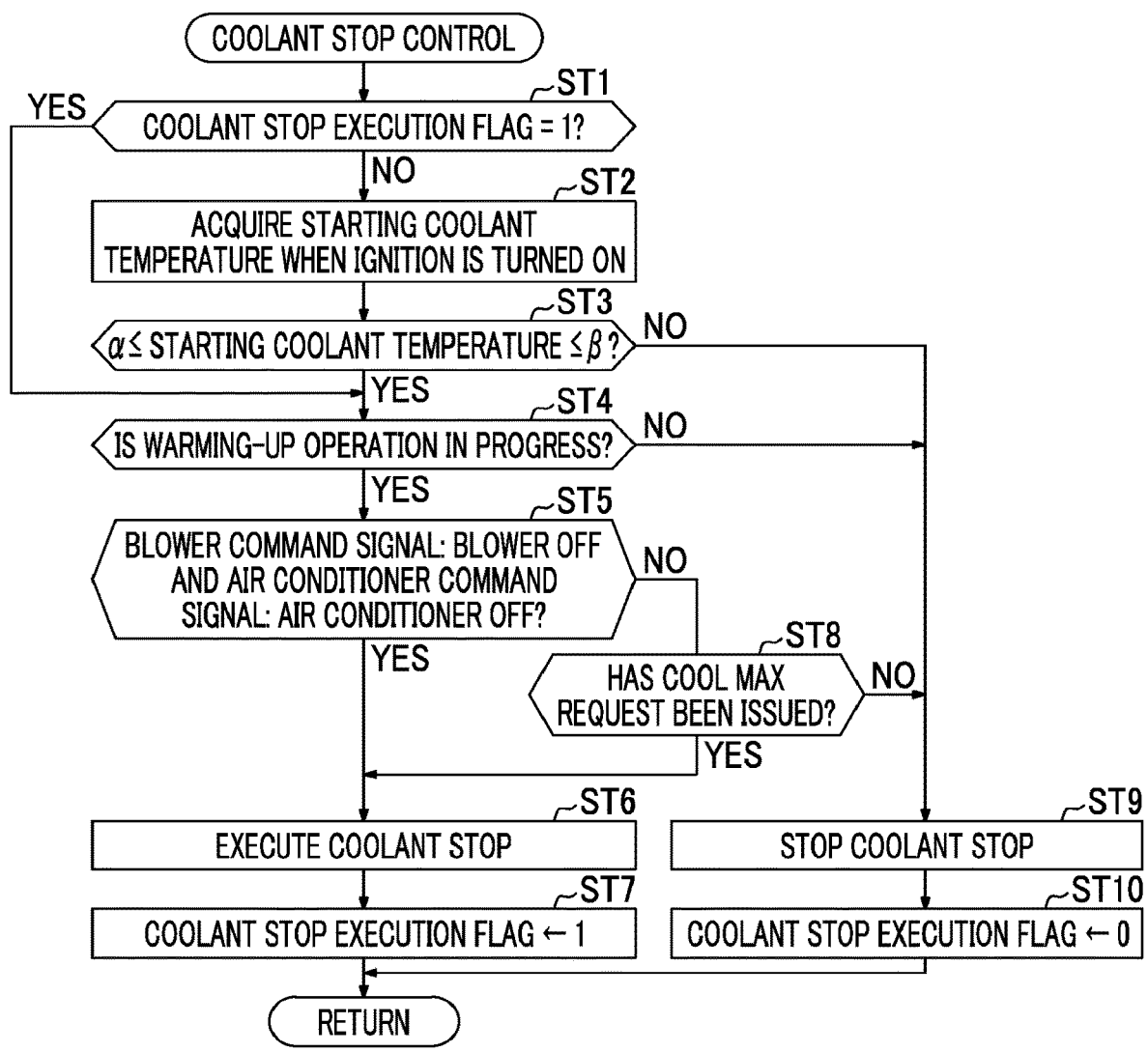
FIG. 4 is a flowchart illustrating a coolant stop control routine according to a first embodiment.

A first embodiment of the coolant stop control will be described below with reference to the flowchart illustrated in FIG. 4. This flowchart is repeatedly performed at predetermined time intervals after the ignition switch IS of the vehicle has been turned on. At the time point at which the ignition switch IS is turned on, a coolant stop execution flag which will be described later is reset to "0."

First, in Step ST1, it is determined whether the coolant stop execution flag is set to "1." The coolant stop execution flag is a flag which is switched to ON when the coolant stop is executed. Since the coolant stop execution flag is reset to "0" at the time point at which the ignition switch IS is turned on as described above, the determination result of Step ST1 is NO and then Step ST2 is performed.

In Step ST2, a starting coolant temperature at the time point at which the ignition switch IS is turned on is acquired. The starting coolant temperature is a temperature of the coolant which is detected by the outlet coolant temperature sensor S2 at the time point at which the ignition switch IS is turned on, and information of the coolant temperature which is stored in the readable and writable memory at the time point at which the ignition switch IS is turned on is read in Step ST2. The starting coolant temperature may be the coolant temperature which is detected by the inlet coolant temperature sensor S1 at the time point at which the ignition switch IS is turned on, or may be an average temperature of the coolant temperature detected by the inlet coolant temperature sensor S1 and the coolant temperature detected by the outlet coolant temperature sensor S2.

Thereafter, in Step ST3, it is determined whether the starting coolant temperature is within a predetermined range ($\alpha \leq$ starting coolant temperature $\leq \beta$). The values of $\alpha$ and $\beta$ can be arbitrarily set. For example, $\alpha$ is 5° C. and $\beta$ is 40° C.

When the starting coolant temperature is not within the predetermined range and the determination result of Step ST3 is NO, it is determined in Step ST9 that the starting coolant temperature does not satisfy temperature conditions for executing the coolant stop control, and the coolant stop control is stopped. That is, circulation of the coolant in the coolant circulation circuit 2 is permitted. Thereafter, in Step ST10, the coolant stop execution flag is reset to "0" and the flowchart restarts.

On the other hand, when the starting coolant temperature is within the predetermined range and the determination result of Step ST3 is YES, it is determined in Step ST4 whether a current operating state of the engine 10 is during the warming-up operation. This determination is to determine whether the current temperature of the coolant detected by the outlet coolant temperature sensor S2 is equal to or higher than a warming-up end temperature (for example, 70° C.).

Since the coolant temperature is lower than the warming-up end temperature at the time point at which the cold start of the engine 10 is started, the operating state of the engine 10 is during the warming-up operation, the determination result of Step ST4 is YES, and then Step ST5 is performed.

In Step ST5, it is determined whether a blower command signal (a command signal for controlling operation of the blower 52) is in an OFF state and an air conditioner command signal (a command signal for controlling circulation of a refrigerant in the refrigerant circulation circuit 40) is in an OFF state as command signals which are transmitted from the electronic control unit 25 to the air conditioner 50. For example, when the air conditioner switch 31 is not turned on and a wind volume switch for setting an amount of air blast of the blower 52 in a manual mode is located at an OFF position, the determination result of Step ST5 is YES.

When the determination result of Step ST5 is YES, the coolant stop control is executed in Step ST6. That is, the rotor is caused to rotate to the positions at which the opening ratios of the ports P1 to P3 of the rotary valve 14 are "0%" to stop circulation of the coolant in the coolant circulation circuit 2.

After the coolant stop control is executed in this way, the coolant stop execution flag is set to "1" in Step ST7.

In a next routine, since the coolant stop execution flag is already set to "1," the determination result of Step ST1 is YES and it is determined in Step ST4 whether the current operating state of the engine 10 is during the warming-up operation.

When the warming-up operation of the engine 10 is continuously performed and the determination result of Step ST4 is YES, it is determined in Step ST5 whether the blower command signal is in the OFF state and the air conditioner command signal is in the OFF state as described above.

When the state in which the blower command signal is in the OFF state and the air conditioner command signal is in the OFF state is maintained in a period in which the warming-up operation of the engine 10 is continuously performed, the operations of Steps ST1, ST4, ST5, ST6, and ST7 are repeatedly performed.

When the warming-up operation of the engine 10 is completed without switching the blower command signal to an ON state or switching the air conditioner command signal to an ON state, the determination result of Step ST4 is NO and the coolant stop control is stopped in Step ST9. That is, circulation of a coolant in the coolant circulation circuit 2 is started to start cooling of the engine 10 (prevention of overheating of the engine 10). Thereafter, in Step ST10, the coolant stop execution flag is reset to "0" and then the flowchart restarts.

On the other hand, when the blower command signal is switched to the ON state or the air conditioner command signal is switched to the ON state in the period in which the warming-up operation of the engine 10 is continuously performed, it is determined in Step ST8 whether the air conditioner command signal is a cool MAX request. A cool MAX request is issued when a cooling request is issued for the air conditioner 50, a difference between the current temperature of the vehicle compartment and the target temperature of the vehicle compartment is less than a predetermined temperature (5° C.), and the air mix door 54 fully closes the heater core 16 side. That is, the cool MAX request is issued when the cooling request has a high priority and an amount of air blast flowing in the heater core 16 is set to zero.

When the air conditioner command signal Is not the cool MAX request, the determination result of Step ST8 is NO and the coolant stop control is stopped in Step ST9. That is, circulation of a coolant in the coolant circulation circuit 2 is started such that the coolant (warm water) is supplied to the heater core 16 in consideration that there is a likelihood that a heating request will be issued for the air conditioner 50. Thereafter, in Step ST10, the coolant stop execution flag is reset to "0" and the flowchart restarts.

On the other hand, when air conditioner command signal is the cool MAX request, the determination result of Step ST8 is YES and the coolant stop control is executed in Step ST6. That is, the rotor is caused to rotate to the positions at which the opening ratios of the ports P1 to P3 of the rotary valve 14 are "0%" and circulation of the coolant in the coolant circulation circuit 2 is stopped.

After the coolant stop control has been executed in this way, the coolant stop execution flag is set to "1" in Step ST7.

The above-mentioned operations are repeatedly performed. Accordingly, the operations of Steps ST5, ST8, and ST6 are an example of the operation of the flow rate control unit (the flow rate control unit that sets the flow rate of the coolant which is adjusted by the flow rate adjuster to be less than the lower limit value of the adjustable range of the flow rate of the coolant which is adjusted in the vehicle compartment air-conditioning state in which the air blast volume adjusting member causes an air blast to flow into the heater core (more specifically, that sets the flow rate of the coolant to zero) when the air blast volume adjusting member fully closes the heater core side in the air blast passage) which is described in the claims.

As described above, in the embodiment, when the amount of air blast flowing in the heater core 16 is set to zero by the air mix door 54 (when the cool MAX request is issued) during the warming-up operation of the engine 10, the flow rate of the coolant which is adjusted by the rotary valve 14 (the flow rate of the coolant which is introduced into the heater core 16) is set to zero (the coolant stop control is executed by controlling the rotary valve 14). That is, when the heater core 16 side of the air blast passage 5A is fully closed (when the amount of air blast flowing in the heater core 16 is set to zero), the amount of heat of the coolant which is taken away by the heater core 16 and the pipe of the heater core coolant passage R2 is set to zero by setting the flow rate of the coolant which is introduced into the heater core 16 to zero. Accordingly, it is possible to prevent an increase in temperature of the coolant from being slow during the warming-up operation of the engine 10. As a result, it is possible to early complete the warming-up operation of the engine 10 and to achieve an improvement in a fuel consumption ratio.

In the embodiment when an air-conditioning request such as heating the vehicle compartment is issued (when the heater core 16 side of the air blast passage 5A is not fully closed: when the amount of air blast flowing in the heater core 16 is not set to zero) during the warming-up operation of the engine 10, the flow rate of the coolant which is adjusted by the rotary valve 14 (the flow rate of the coolant which is introduced into the heater core 16) is set to be within a predetermined adjustable range (within an adjustable range for coping with a heating request or the like) and thus it is possible to cope with the air-conditioning request.

Second Embodiment

A second embodiment of the coolant stop control will be described below. In this embodiment, coolant stop control switched between execution and non-execution in response to an air-conditioning request for the air conditioner 50 during a warming-up operation of the engine 10. Specifically, by storing a plurality of maps (rotary valve control maps) for defining an area in which the coolant stop control is executed (an area of the coolant temperature) during the warming-up operation of the engine 10 in the read only memory and switching the rotary valve control map to be used depending on the operating state of the air conditioner 50, the coolant stop control is switched between execution and non-execution based on a rotary valve control map.

Figure 5:
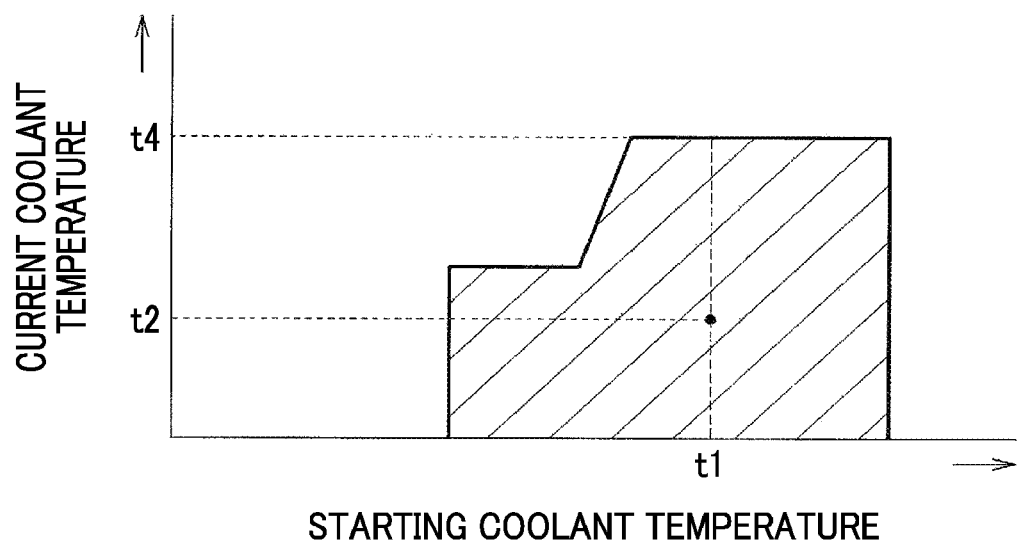
FIG. 5 is a diagram illustrating an example of a first rotary valve control map which is used for a second embodiment.
Figure 6:
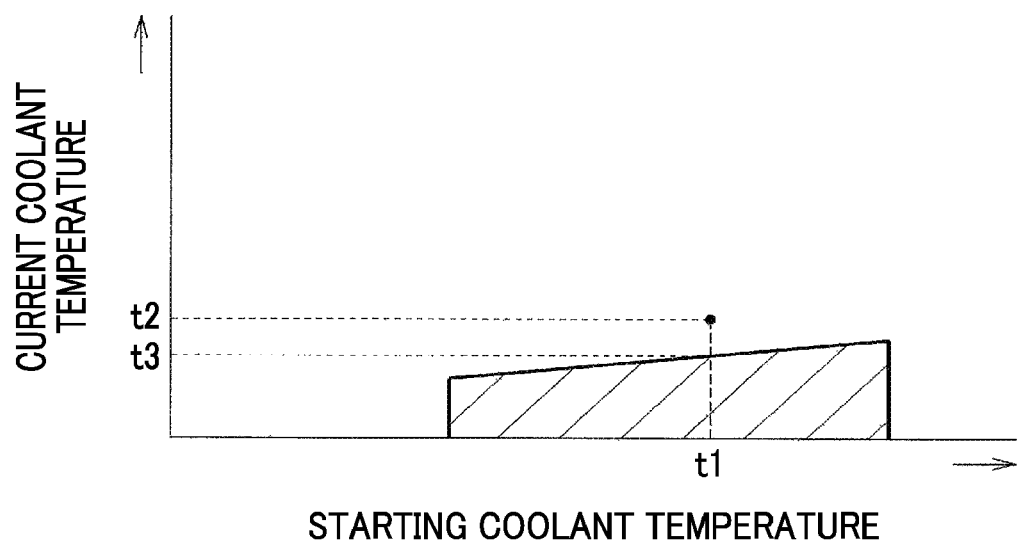
FIG. 6 is a diagram illustrating an example of a second rotary valve control map which is used for the second embodiment.

FIG. 5 illustrates a first rotary valve control map which is used in the cool MAX state in the stopping state of the air conditioner 50 and the operating state of the air conditioner 50. FIG. 6 illustrates a second rotary valve control map which is used in a state other than the cool MAX state in the operating state of the air conditioner 50. Hatched areas in the rotary valve control maps denote coolant stop execution areas.

The coolant stop execution area (an area in which the rotary valve 14 is controlled such that the coolant stop control is performed) in the first rotary valve control map is wider than the coolant stop execution area in the second rotary valve control map. For example, when the starting coolant temperature is t1 in the drawings and the current coolant temperature during the warming-up operation of the engine 10 is t2 in the drawings, the coolant stop control is not executed in the second rotary valve control map (in a state other than the cool MAX state in the operating state of the air conditioner 50), but the coolant stop control is executed in the first rotary valve control map (in the cool MAX state in the stop state of the air conditioner 50 and the operating state of the air conditioner 50).

In an example of an operation of switching the coolant stop control between execution and non-execution using the rotary valve control maps, for example, when the starting coolant temperature is t1 in the drawings and the operating state of the air conditioner 50 during the warming-up operation of the engine 10 is a state other than the cool MAX state, the coolant stop control is switched to non-execution (the coolant stop control is released) at a time point at which the coolant temperature reaches t3 in FIG. 6 and a coolant is supplied to the heater core 16 via the heater core coolant passage R2. Accordingly, it is possible to rapidly cope with a heating request for the vehicle compartment or the like.

On the other hand, for example, when the starting coolant temperature is t1 in the drawings and the operating state of the air conditioner 50 during the warming-up operation of the engine 10 is the cool MAX state, the coolant stop control is continuously performed until the coolant temperature reaches t4 in FIG. 5, and introduction of a coolant into the heater core coolant passage R2 is prohibited. Accordingly, the amount of heat of the coolant which is taken away by the heater core 16 and the pipe of the heater core coolant passage R2 is set to zero. Accordingly, it is possible to prevent an increase in temperature of the coolant form becoming slow during the warming-up operation of the engine 10. As a result, it is possible to early complete the warming-up operation of the engine 10 and to achieve an improvement in a fuel consumption ratio.

Other Embodiments

The above-disclosed embodiments are exemplary in all respects and do not serve as a basis of any definitive construction. Accordingly, the technical scope of the disclosure is not construed based on only the embodiments but is defined based on description of the appended claims. The technical scope of the disclosure includes all modifications within meanings and scopes equivalent to the claims.

For example, in the embodiments, a degree of opening of the air mix door 54 is recognized (whether the heater core 16 side is fully closed is determined) based on the air conditioner command signal. The disclosure is not limited to the embodiments, and a sensor that outputs a signal corresponding to a rotational position of the air mix door 54 may be provided and the degree of opening of the air mix door 54 may be recognized (whether the heater core 16 side may be fully closed is determined) based on the output signal of the sensor.

In the above-mentioned embodiments, when the air mix door 54 fully closes the heater core 16 side (the amount of air blast flowing in the heater core 16 is set to zero) during the warming-up operation of the engine 10, the opening ratio of the heater core port P2 of the rotary valve 14 is set to "0%" to set the flow rate of the coolant which is supplied to the heater core 16 to zero. The disclosure is not limited to the embodiments, and the heater core port P2 may be slightly opened and a slight amount of coolant may be supplied to the heater core 16. The opening ratio of the heater core port P2 in this case is set to a value which is less than the lower limit value of the opening ratio corresponding to the adjustable range of the flow rate of the coolant which is adjusted in the vehicle compartment air-conditioning state in which the air mix door 54 causes an air blast to flow to the heater core 16. That is, the opening ratio of the heater core port P2 is set to be less than the lower limit value of the adjustable range of the flow rate of the coolant which is adjusted in the vehicle compartment air-conditioning state in which the air mix door 54 causes an air blast to flow to the heater core 16. In this case, the amount of heat of the coolant which is taken away by the heater core 16 and the pipe of the heater core coolant passage R2 for supplying a coolant to the heater core 16 is small and it is possible to prevent an increase in temperature of the coolant as a whole from being slow.

In the above-mentioned embodiments, the flow rate of the coolant which is introduced into the heater core 16 is adjusted by controlling the rotary valve 14. The disclosure is not limited to the embodiments, but the flow rate of the coolant which is introduced into the heater core 16 may be set to zero or may be set to be less than the lower limit of the adjustable range by using an electric water pump that operates with an electric motor as the water pump and stopping the electric water pump.

The disclosure is applicable to control of adjusting a flow rate of a coolant in a coolant circulation circuit in response to an air conditioning request.

What is claimed is:

1. A cooling device for an internal combustion engine, comprising:

an air blast passage in which an air blast for air-conditioning a vehicle compartment flows;

a heater core that is disposed in the air blast passage and heats the air blast using a coolant which is introduced from the internal combustion engine as a heat source;

an air blast volume adjusting member that is opened and closed to adjust an air blast volume which flows in the heater core and an air blast volume which flows without passing through the heater core in the air blast passage;

a flow rate adjuster that adjusts a flow rate of the coolant which is introduced into the heater core;

an air conditioner including the air blast passage and the air blast volume adjusting member; and a controller configured to set the flow rate of the coolant which is adjusted by the flow rate adjuster, wherein the controller is configured to perform coolant stop control by setting the flow rate of the coolant which is adjusted by the flow rate adjuster to be less than a lower limit value of an adjustable range of the flow rate of the coolant which is adjusted by the flow rate adjuster in a vehicle compartment air-conditioning state in which the air blast volume adjusting member allows an air blast to flow to the heater core when the air blast volume adjusting member fully closes the heater core side of the air blast passage, and wherein when an operating state of the air conditioner during a warming-up operation of the internal combustion engine is a cool MAX state, the controller is configured to continuously perform the coolant stop control until a coolant temperature reaches a first predetermined temperature, and when the operating state of the air conditioner during the warming-up operation of the internal combustion engine is a state other than the cool MAX state, the controller is configured to release the coolant stop control at a time point at which the coolant temperature reaches a second predetermined temperature.

2. The cooling device according to claim 1, wherein the controller is configured to set the flow rate of the coolant which is adjusted by the flow rate adjuster to be equal to or greater than the lower limit value of the adjustable range of the flow rate of the coolant which is adjusted in the vehicle compartment air-conditioning state when the air blast volume adjusting member does not fully close the heater core side of the air blast passage during the warming-up operation of the internal combustion engine, and is configured to set the flow rate of the coolant which is adjusted by the flow rate adjuster to be less than the lower limit value of the adjustable range when the air blast volume adjusting member fully closes the heater core side of the air blast passage during the warming-up operation of the internal combustion engine.

3. The cooling device according to claim 2, wherein the controller is configured to set the flow rate of the coolant which is adjusted by the flow rate adjuster to zero when the air blast volume adjusting member fully closes the heater core side of the air blast passage.

4. The cooling device according to claim 1, wherein the controller is configured to set the flow rate of the coolant which is adjusted by the flow rate adjuster to zero when the air blast volume adjusting member fully closes the heater core side of the air blast passage.

5. The cooling device according to claim 1, wherein the flow rate adjuster includes a rotary valve including a radiator port which communicates with a radiator cooling passage, a heater core port which communicates with a heater core coolant passage, and a device port which communicates with a device coolant passage, and wherein opening ratios of the radiator port, the heater core port, and the device port vary based on a rotor phase of the rotary valve.

* * * * *